United States Patent

Becker et al.

(10) Patent No.: US 6,520,307 B2
(45) Date of Patent: Feb. 18, 2003

(54) ADJUSTING DEVICE FOR A VEHICLE SEAT WITH A SILENT RATCHET HAVING A FIRST RATCHET PORTION AND A SECOND RATCHET PORTION

(75) Inventors: Burckhard Becker, Solingen (DE); Robert Houston, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 09/728,131

(22) Filed: Dec. 1, 2000

(65) Prior Publication Data

US 2001/0002554 A1 Jun. 7, 2001

(30) Foreign Application Priority Data

Dec. 3, 1999 (DE) .......................................... 199 58 300

(51) Int. Cl.[7] .................................................. B60N 2/02
(52) U.S. Cl. ....................................... 192/223; 297/374
(58) Field of Search ............................... 192/223, 223.1, 192/43.1; 297/367, 374; 74/528; 188/82.77

(56) References Cited

U.S. PATENT DOCUMENTS

| | | | | |
|---|---|---|---|---|
| 2,685,350 A | * | 8/1954 | Falk ........................ | 188/82.77 |
| 4,997,223 A | * | 3/1991 | Croft ........................... | 297/367 |
| 5,518,094 A | * | 5/1996 | Myrick ..................... | 188/82.77 |
| 5,590,931 A | * | 1/1997 | Fourrey et al. ............. | 297/366 |
| 5,769,494 A | * | 6/1998 | Barrere et al. .............. | 297/367 |
| 6,092,874 A | * | 7/2000 | Kojima et al. .............. | 297/366 |
| 6,224,157 B1 | * | 5/2001 | Di Luccio ............... | 192/223.1 |
| 6,312,053 B1 | * | 11/2001 | Magyar ..................... | 297/367 |

FOREIGN PATENT DOCUMENTS

| | | | |
|---|---|---|---|
| DE | 32 20 586 A1 | * | 12/1983 |
| JP | 58-131432 A | * | 8/1983 |

* cited by examiner

*Primary Examiner*—Rodney H. Bonck
(74) *Attorney, Agent, or Firm*—Akerman Senterfitt

(57) ABSTRACT

The adjusting device for a vehicle seat has a silent ratchet including a first and a second ratchet portion. The first ratchet portion has an inner lining. The second ratchet portion opposes the first ratchet portion and is capable of rotating about an axis of the inner lining and carries at least one clamping lever pivotable about an axis of the clamping lever. The clamping lever has a clamping area located in a neighborhood of the inner lining. The clamping lever is pivoted between a clamping position in which the lever is frictionally engaged with the inner lining, and a release position. Either the inner lining is provided with a clamping groove and the clamping area is designed as an engaging part adapted thereto, or the inner lining is provided with a clamping ridge and the clamping area is designed as a covering part adapted to this clamping ridge.

26 Claims, 2 Drawing Sheets

Figure 1:
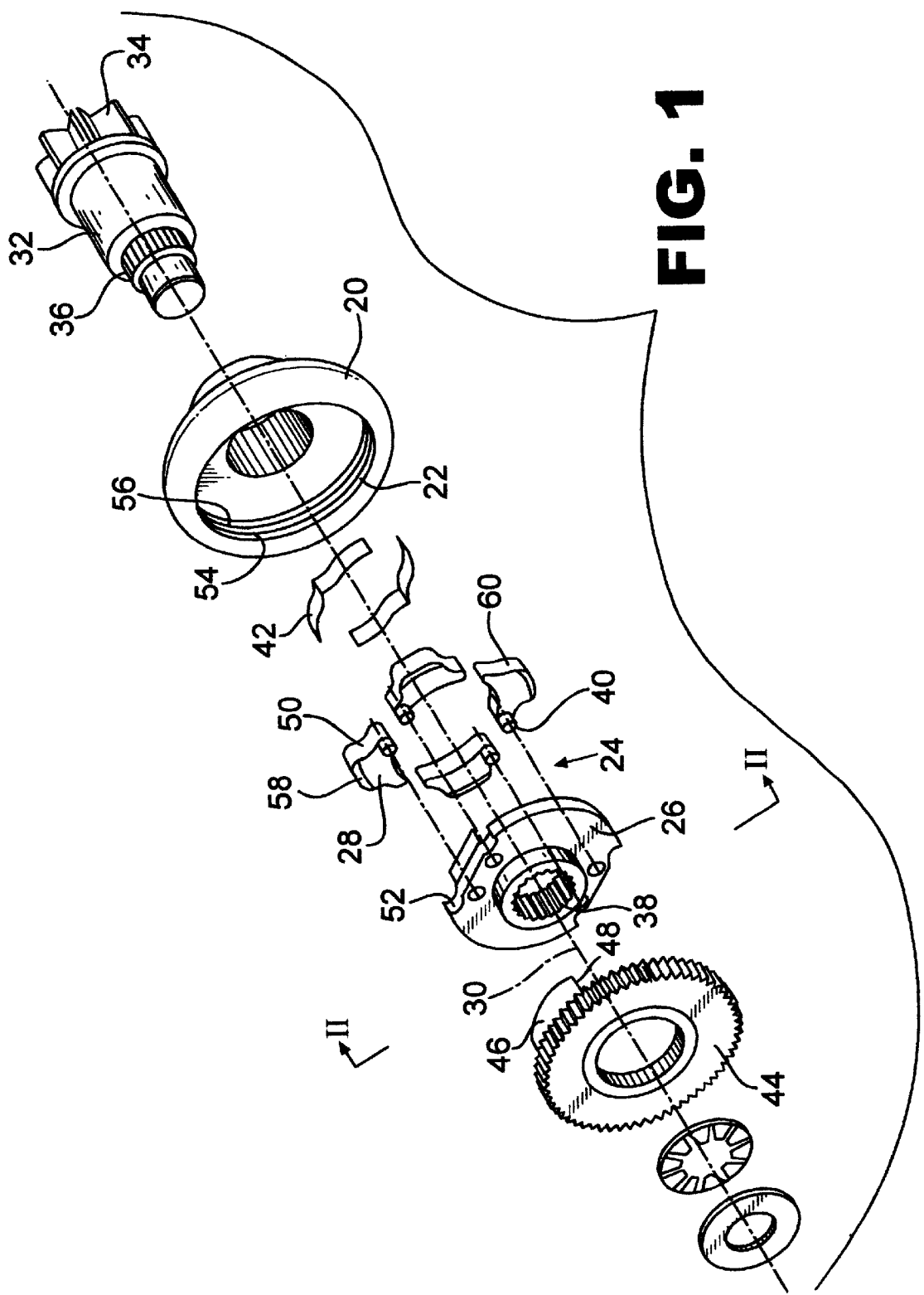

ADJUSTING DEVICE FOR A VEHICLE SEAT WITH A SILENT RATCHET HAVING A FIRST RATCHET PORTION AND A SECOND RATCHET PORTION

The invention relates to an adjusting device for a vehicle seat with a silent ratchet including a first ratchet portion having an inner lining which is defined by a rotating body and a second ratchet portion which is a) arranged so as to oppose the first ratchet portion and to be capable of rotating about an axis of the inner lining and b) which carries at least one clamping lever capable of pivoting about an axis of the clamping lever, the clamping lever having a clamping area located in the neighbourhood of the inner lining and an actuating device for the clamping lever being provided so that the clamping lever may be pivoted in a controlled manner between the normal clamping position in which the lever is frictionally engaged with the inner lining, a non rotatable connection of the two ratchet portions being provided thereby, and a release position, in which the clamping area is located at a distance from the inner lining.

The adjusting device of the type mentioned above is provided with two pairs of clamping levers which are arranged, axially staggered by 180 degrees, in the same radial plane. The clamping levers are designed as flat parts. One clamping lever of each pair locks in one rotating direction, the other locks in the other rotating direction. In order to guard them from axial motion, a groove is provided in the inner lining. In the normal clamping position the four clamping levers abut the bottom of said groove.

The clamping levers engage the inner lining at an angle of nearly 90 degrees when they are in the clamping position. In other words, a connecting line of an axis of the clamping lever intersects a tangent with the osculation point of said clamping lever on the inner lining at the osculation point at an angle of approximately 90°.

Thus, the clamping forces substantially act radially, which entails that the inner lining is subjected to considerable load. The steep angle at which the clamping levers engage the inner lining also contributes to increase the load exerted onto the inner lining. Although the inner lining is very sturdy, it remains yielding to a certain extent in the clamping state. This leads to situations in which the clamping levers engaging the inner lining cannot be precisely controlled.

Starting from these premises, the object of the present invention is to modify the inner lining in such a manner that the clamping forces cannot exert such high deformations on the inner lining as is the case with the state of the art devices. The specific objective of the invention is to bring the clamping forces to arise on purpose and in a predictable manner and to act with short lever arms.

Starting from the adjusting device of the type mentioned above provided with a silent ratchet, the solution of this object is to provide the inner lining with a surroundings clamping groove having two lateral surrounding clamping surfaces, to design the clamping area as an engaging part adapted to said clamping groove, said engaging part having two sloping clamping sides, each cooperating with one clamping surface.

In a kinematic reversal, the inner lining is not provided with a clamping groove, a clamping ridge this time projects from the inner lining radially inward. In this embodiment, the solution of the object cited is that the inner lining is provided with a surrounding clamping ridge having two lateral surrounding clamping surfaces, that the clamping area is a covering part adapted to said clamping ridge, said covering part having two clamping flanks, each of them cooperating with a clamping surface.

With these adjusting devices, the clamping forces essentially act in axial direction and on very short paths. The curve described by the forces remains in the environment of the clamping groove or in the covering part. Substantially, the clamping forces merely subject the clamping groove to a load or, in the solution of kinematic reversal, it is the covering part which is subjected to load. But, with simple means, both parts may be made so sturdy mechanically that in the case of clamping only very slight deformations take place. These parts still remain lightweight since, as opposed to the state of the art, a considerable amount of material is being saved while stability is increased.

According to the invention, the curve of the clamping forces and the resulting reactions in the covering part or in the wall of the clamping groove is a relatively small closed revolution with a relatively short path. It is clearly located outside the axis. The paths of force are accordingly short. No sensible deformation of the inner lining has to be feared. The clamping forces compensate substantially on a short path, they are oriented toward each other.

The invention makes it possible to manufacture a silent ratchet that has good operational properties and an accurate response, that is lightweight and that also shows good properties in continuous operation.

As with the state of the art devices, it is advantageous to provide at least two pairs of clamping levers and to dispose said two pairs of clamping levers in mirror symmetry about a mirror plane running through the axis. In this way, two braking moments staggered by 180° are preserved in case of clamping, which reduces the loads exerted on the axis of the silent ratchet.

It is furthermore advantageous to have the axis of the clamping lever arranged in the neighbourhood of an end area of the clamping lever. This results in an embodiment which is advantageous for controlling the releasing processes and allows to arrange the axis of the clamping lever in closer proximity to the inner lining than to the axis of the silent ratchet.

In another preferred embodiment a clamping spring is allocated to the at least one clamping lever, said clamping spring being disposed between the clamping lever and the second ratchet portion and biassing the clamping lever in a clamping position. As with the state of the art devices the silent ratchet is normally locked. In the pairs of clamping levers, those clamping levers undertake the locking function in one direction of rotation which are located in front in this direction of rotation. The clamping levers lying behind in the direction of rotation are trailed and, owing to the clamping spring, abut on the clamping groove or on the clamping ridge without any clamping function.

In still another development, the second ratchet portion is rotatably connected to a driven shaft, a release wheel being provided at the driving end which is capable of pivoting about the axis and which is provided with at least one dog projection which is located in the motion area of the clamping lever and of a dog flank of the second ratchet portion and which, on a pivotal movement of the release wheel leaving its normal position, presses the clamping lever, which is self-locking in the corresponding direction of rotation, out of the clamping position and retains it prior to contacting the dog flank. This construction permits to advantageously design the control of the clamping levers in a release position. Only short pivoting angles are required to press the clamping lever, which is locking in one direction of rotation, into the release position before the drive takes place in the pivoting direction considered.

In a particularly preferred embodiment, the distance between the axis of the clamping lever and the clamping area is at least 1.4 times greater, more specifically 1.6 to 2.5 times greater, preferably 1.8 times greater than the distance between the axis of the clamping lever and the inner lining. Contrary to the state of the art devices, the clamping levers engage the inner lining at an angle which is clearly farther away from a radial through the clamping point than it is the case with the state of the art devices. The angle made by a connecting line between the axis of the clamping lever and the clamping point on one side and by a radial through the axis of the clamping lever on the other side, is not inferior to 45°, it preferably is of approximately 60°. A secure clamping position and a good hold in the clamping point are hereby achieved, even when the parts effecting the clamping have been lubricated. The clamping point refers to the area of contact in which the actual clamping occurs between clamping area and clamping ridge or clamping groove.

Figure 2:
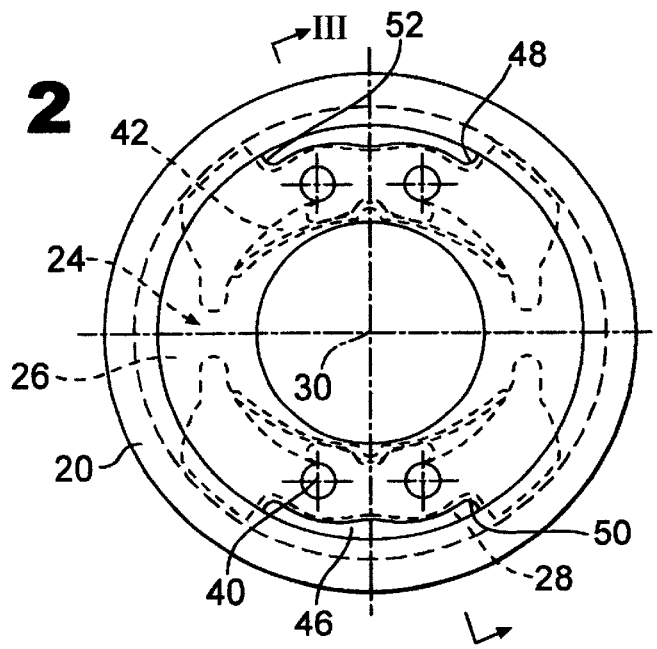
Figure 3:
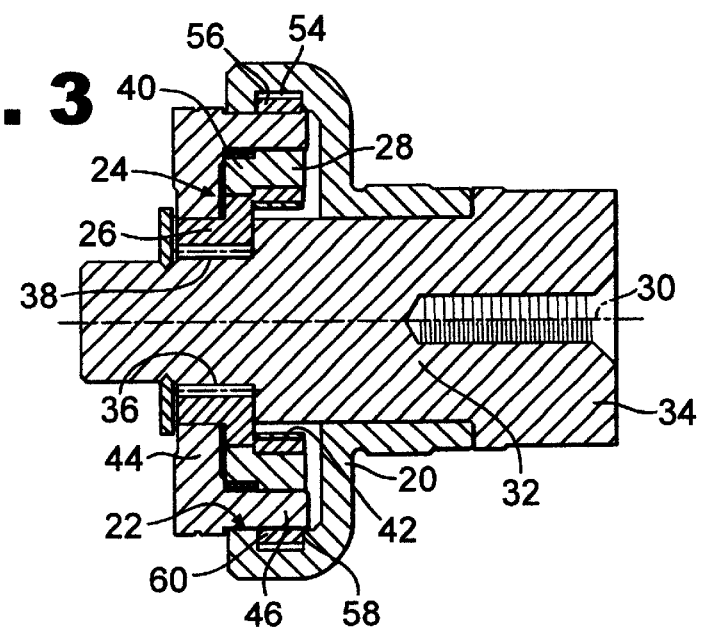
Figure 4:
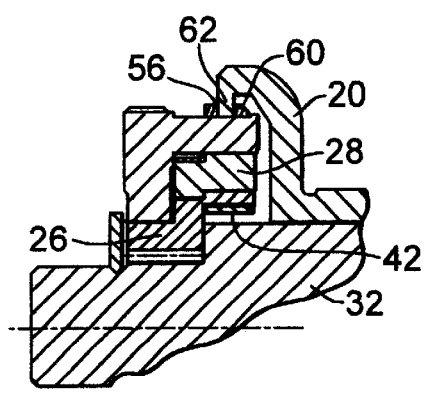

Further advantages and characteristics of the invention will become apparent in the remaining claims and in the following description by way of example of two embodiments of the invention that will be explained in more detail with reference to the drawing wherein:

FIG. 1 is a perspective illustration in the sense of an assembly drawing showing an adjusting device with a clamping groove, FIG. 2: is a sectional view taken through line II—II of FIG. 1, FIG. 3: is a section through the adjusting device with an axial cutting plane running through the axis of the clamping lever of two opposing clamping levers according to the line of section III—III of FIG. 2 and FIG. 4: is an illustration similar to FIG. 3 for a modified embodiment, provided now with a clamping ridge and clamping levers having each a covering part, only the clamping area being shown.

The embodiment illustrated in the FIGS. 1 through 3 will be discussed first. The explanations given with reference to this first embodiment are also true for the second embodiment, which, except for small differences, is built in a way similar to the first embodiment. In the discussion of the second embodiment, the differences only will be presented, the conformities will not be stressed in particular. So far, anything said with reference to the first embodiment is also true for the second embodiment inasmuch as no difference has been worked out.

As shown in the FIGS. 1 through 3 the adjusting device has a silent ratchet. Said silent ratchet has a first ratchet portion 20 of the shape of a pot with an axially provided hub. It is a pivoted part and has an inner lining 22 which is accordingly defined by a rotating body as well.

The first ratchet portion 20 cooperates with a second ratchet portion 24 which is substantially constituted by a soleplate 26 and four clamping levers 28. This second ratchet portion 24 is rotatable about an axis 30 of the inner lining 22 relative to the first ratchet portion 20. To fit the purpose, a pin 32, supporting a pinion 34 on its one end side, extends through the hub of the first ratchet portion 20. The pin 32 has teeth 36 cooperating with an internal gear 38 of the soleplate 26.

The soleplate 26 has two pairs of bores for receiving the axes 40 of clamping levers of each of the four clamping levers 28. The clamping levers are thus arranged two by two in mirror symmetry about an axial mirror plane. They are pivotal about the axes 40 of the clamping levers relative to the soleplate 26. A biassing spring 42 is allocated to each pair of clamping levers 28, said biassing spring being designed as a slightly bent leaf spring. The biassing spring 42 urges both clamping levers 28 to which it has been assigned outward.

The soleplate 26 is fitted with a release wheel 44 which is provided with an external gear. It additionally has two axially projecting driving pins 46, one driving pin being allocated to one pair of clamping levers. The release wheel 44 is pivotal about the axis 30, it is positioned in close proximity, to the soleplate 26. In the concrete embodiment, the soleplate has an axial connection piece for receiving and carrying a cylindrical inner surface of the release wheel 44 with its outer lining. The release wheel 44 is hence pivotally carried directly on the soleplate 26.

The soleplate 26 is located between the four clamping levers 28 and the release wheel 44. In the area of the two pairs of bores of the bearings, the soleplate 26 has flattenings for the axes 40 of the clamping levers. Owing to these flattenings, the two driving pins 46 can extend beyond the soleplate 26 and project into the area of the clamping levers 28. The driving pins are provided with a control surface 48 arranged on their two end sides located forward and rearward with respect to the direction of rotation. A control bight 50 of a corresponding clamping lever 48 is allocated to each control surface 48. When the silent ratchet is in neutral position, the control surfaces 48 are not in contact with the control bights 50, they rather are all positioned at some distance therefrom. But if the release wheel 44 is pivoted to the right or to the left relative to the soleplate 26, the control surface 48 of each of the two driving pins 46, which is positioned in front relative to the direction of rotation, abuts on the control bight 50 of a clamping lever 28. The clamping lever involved is the one which locks in the direction of driving rotation of the release wheel 44. The other clamping lever 28 of the same pair locks in the other direction of rotation and is irrelevant for the direction of rotation considered, it is autonomously released by being pivoted or pulled.

By continuing to turn the release wheel 44 relative to the soleplate 26, the control surface 48 of each of the two driving pins 46, which lies in front relative to the direction of movement, is brought into contact with a dog surface 52 of the soleplate 26. Each of the two flattenings of the release wheel 44 is limited by two dog surfaces 52. When the control surface 48 abuts on the dog surface 52, the subsequent movement of rotation of the release wheel 44 is imparted to the soleplate 26. Since said soleplate is rotatably connected with the pinion 34, the subsequent rotation of the release wheel 44 causes the pinion 34 to rotate, thus effecting a drive.

In the neutral position of the silent ratchet, the release wheel 44 is located in the following position: the two control surfaces 48 of each of the two driving pins 46 are spaced from the corresponding neighbouring control bight 50, the spacing being substantially equal for all four pairs of control surfaces 48 and mating control bights 50. Furthermore, the two control surfaces 48 of each of the two driving pins 46 are spaced from the corresponding neighbouring dog surface 52 by a distance greater than the distance to the corresponding neighbouring control bights 50. In other words, the driving pins are arranged symmetrically about the already mentioned axial mirror plane. If, in this condition, a torque is applied to the pinion 34, the two clamping levers 28 which lie in front relative to the direction of rotation are pressed inward in the very minute they are subjected to load, that is to say that they are moved into mesh even more. As a result, the torque is imparted to the first ratchet portion 20. If said first ratchet portion is connected to a stationary part of the adjusting device, the torque is not imparted to the release wheel 44.

As indicated in the FIGS. 1 through 3, a clamping groove 54 is formed in the inner lining 22, said clamping groove having two lateral surrounding clamping surfaces 56. They are inclined to one another at an angle of 8 to 14 degrees and are additionally arranged mirror-inverted about a radial plane running through the centre of the clamping groove. Said clamping surfaces 56 cooperate with two sloping clamping sides 58 in a clamping area 60 of each clamping lever 28. Said sloping clamping sides are also inclined to one another to form a V. They are hardened. The angle they form is slightly larger than the angle between the two clamping surfaces 56. This occasions a jam within the clamping groove 54 when a clamping lever reaches with its clamping area far enough into the clamping groove 54. Contact only occurs at the side, the clamping lever is not brought into contact with the bottom of the clamping groove 54.

The clamping surfaces 56 may be plain or corrugated, finely serrated, provided with microgrooves. The same is true for the sloping clamping sides 58. The clamping areas are located within the clamping grooves 54. For this reason the clamping area is also called an engaging part. This engaging part is adapted to the clamping groove 54.

The relative angles at which the sloping clamping sides 58 and the adjacent clamping surfaces 56 meet are inferior to the range in which self-locking occurs, with steel as a material this being below 7 degrees.

The distance of the axis 40 of the clamping lever from the clamping point of the clamping area 60 is at least 1.4 times greater than the distance separating the axis 40 of the clamping lever from the inner lining 22. In other words, a tangent goes through the clamping point situated between the sloping clamping sides 58 and the clamping surfaces 56 and is inclined at an angle of approximately 30 degrees relative to a connection line between the clamping point and the axis 40 of the clamping lever. This angle should be inferior to 45 degrees, irrespective of the concrete embodiment.

In the embodiment of FIG. 4, the inner lining 22 has a clamping ridge 62 projecting toward the axis, said clamping ridge 62 having in its turn the two lateral surrounding clamping surfaces 56. Instead of an engaging part, a covering part is now provided, which covers the clamping ridge 62 in the shape of a U. This covering part constitutes the clamping area 60 of the clamping lever 28. The angular relationships are the same as with the first embodiment.

An advantage of the embodiment according to the invention is that the clamping forces act substantially in axial direction, that is that they either expand the clamping groove 54 or compress the clamping ridge 62. The clamping forces are hereby preferably symmetrical about the already mentioned radial plane which goes through the centre of the clamping groove 54 or the clamping ridge 62. The pot of the first ratchet portion 20 is not sensibly subjected to load thereby. In the same way the clamping forces on the clamping levers may well be absorbed, irrespective of the part being an engaging part or a covering part.

What is claimed is:

1. An adjusting device for a vehicle seat with a silent ratchet, the silent ratchet including a first ratchet portion and a second ratchet portion, the first ratchet portion having an inner lining and an axis of the inner lining, which inner lining is rotationally symmetrical to the axis of the inner lining, the second ratchet portion arranged so as to oppose the first ratchet portion and to be capable of rotating about the axis of the inner lining and which second ratchet portion carries at least one clamping lever, the clamping lever being capable of pivoting about an axis of the clamping lever, the clamping lever having a clamping area located in the neighborhood of the inner lining, the adjusting device further comprising an actuating device for the clamping lever, the clamping lever being pivotable under the action of the actuating device in a controlled manner between a normal clamping position in which the clamping lever is frictionally engaged with the inner lining, so that a non rotatable connection of the first ratchet portion and the second ratchet portion is provided, and a release position, in which the clamping area is located at a distance from the inner lining, the improvement comprising a continuous clamping groove arranged on the inner lining, the clamping groove having two lateral continuous clamping surfaces, wherein the clamping area has an engaging part adapted to said clamping groove, said engaging part having two sloping clamping sides, each of the two sloping clamping sides cooperating with one of the two clamping surfaces, and wherein a distance of the axis of the clamping lever from a clamping point in which the clamping lever contacts the inner lining is at least 1.4 times greater than a distance between the axis of the clamping lever and the inner lining.

2. An adjusting device for a vehicle seat with a silent ratchet, the silent ratchet including a first ratchet portion and a second ratchet portion, the first ratchet portion having an inner lining and an axis of the inner lining, which inner lining is rotationally symmetrical to the axis of the inner lining wherein the second ratchet portion is arranged so as to oppose the first ratchet portion and to be capable of rotating about the axis of the inner lining and which second ratchet portion carries at least one clamping lever, the clamping lever being capable of pivoting about an axis of the clamping lever, the clamping lever having a clamping area located in the neighborhood of the inner lining, the adjusting device further comprising an actuating device for the clamping lever, the clamping lever being pivotable under the action of the actuating device in a controlled manner between a normal clamping position in which the clamping lever is frictionally engaged with the inner lining, so that a non-rotatable connection of the first ratchet portion and the second ratchet portion is provided, and a release position, in which the clamping area is located at a distance from the inner lining, the improvement comprising a continuous clamping ridge arranged on the inner lining, the clamping ridge has two lateral continuous clamping surfaces, the clamping area has an covering part adapted to said clamping ridge, said covering part having two clamping flanks, each of the two clamping flanks cooperating with one of the two clamping surfaces, and wherein a distance of the axis of the clamping lever from a clamping point in which the clamping lever contacts the inner lining is at least 1.4 times greater than a distance between the axis of the clamping lever and the inner lining.

3. The adjusting device of claim 1, wherein at least two clamping levers are provided, the two clamping levers forming one pair of clamping levers and wherein the two clamping levers forming the pair of clamping levers are arranged in mirror symmetry about a mirror plane running through the axis of the inner lining.

4. The adjusting device of claim 1, wherein the axis of the clamping lever is arranged in the neighbourhood of an end area of said clamping lever.

5. The adjusting device of claim 1, wherein a clamping spring is allocated to the clamping lever, said clamping spring being disposed between the clamping lever and the second ratchet portion and biassing the clamping lever in a clamping position.

6. The adjusting device of claim 1, wherein the second ratchet portion is rotatably connected to a driven shaft, and wherein a release wheel is provided at a driving end of the adjusting device which release wheel is capable of pivoting about the axis of the inner lining, and which release wheel is provided with at least one driving pin which driving pin is located in an area of motion of the clamping lever and of a dog surface of the second ratchet portion and which driving pin, on a pivotal movement of the release wheel leaving a normal position of the release wheel, presses the clamping lever, which is self-locking in the corresponding direction of rotation, out of a clamping position and retains it prior to contacting the dog surface.

7. The adjusting device of claim 1, wherein the second ratchet portion, on which at least the one clamping lever is pivotally arranged, is provided with a soleplate, which soleplate is removably and non-pivotally connected to a pinion arranged on a driven shaft.

8. The adjusting device of claim 1, wherein a release wheel is provided at a driving end of the adjusting device which release wheel is rotatably connected to a pinion arranged in a centric manner about the axis of the inner lining and/or to an input shaft.

9. The adjusting device of claim 1, wherein the first ratchet portion or the second ratchet portion is non rotatably connected to the vehicle seat.

10. The adjusting device of claim 1, wherein the distance of the axis of the clamping lever from the clamping point in which the clamping lever contacts the inner lining is 1.6 to 2.5 times greater than the distance between the axis of the clamping lever and the inner lining.

11. The adjusting device of claim 10, wherein the distance of the axis of the clamping lever from the clamping point in which the clamping lever contacts the inner lining is 1.8 times greater than the distance between the axis of the clamping lever and the inner lining.

12. The adjusting device of claim 1, wherein the clamping surfaces engage the mating sloping clamping sides displaying mirror symmetry about a radial plane.

13. The adjusting device of claim 1, wherein the two clamping surfaces are inclined to one another at an angle smaller than 20 degrees.

14. The adjusting device of claim 13, wherein the two clamping surfaces are inclined to one another at an angle of between eight and fourteen degrees.

15. The adjusting device of claim 2, wherein at least two clamping levers are provided, the two clamping levers forming one pair of clamping levers and wherein the two clamping levers forming the pair of clamping levers are arranged in mirror symmetry about a mirror plane running through the axis of the inner lining.

16. The adjusting device of claim 2, wherein the axis of the clamping lever is arranged in the neighbourhood of an end area of said clamping lever.

17. The adjusting device of claim 2, wherein a clamping spring is allocated to the clamping lever, said clamping spring being disposed between the clamping lever and the second ratchet portion and biassing the clamping lever in a clamping position.

18. The adjusting device of claim 2, wherein the second ratchet portion is rotatably connected to a driven shaft, and wherein a release wheel is provided at a driving end of the adjusting device which release wheel is capable of pivoting about the axis of the inner lining, and which release wheel is provided with at least one driving pin which driving pin is located in an area of motion of the clamping lever and of a dog surface of the second ratchet portion and which driving pin, on a pivotal movement of the release wheel leaving a normal position of the release wheel, presses the clamping lever, which is self-locking in the corresponding direction of rotation, out of a clamping position and retains it prior to contacting the dog surface.

19. The adjusting device of claim 2, wherein the second ratchet portion, on which at least the one clamping lever is pivotally arranged, is provided with a soleplate, which soleplate is removably and non-pivotally connected to a pinion arranged on a driven shaft.

20. The adjusting device of claim 2, wherein a release wheel is provided at a driving end of the adjusting device which release wheel is rotatably connected to a pinion arranged in a centric manner about the axis of the inner lining and/or to an input shaft.

21. The adjusting device of claim 2, wherein the first ratchet portion or the second ratchet portion is non rotatably connected to the vehicle seat.

22. The adjusting device of claim 2, wherein the distance of the axis of the clamping lever from the clamping point in which the clamping lever contacts the inner lining is 1.6 to 2.5 times greater than the distance between the axis of the clamping lever and the inner lining.

23. The adjusting device of claim 22, wherein the distance of the axis of the clamping lever from the clamping point in which the clamping lever contacts the inner lining is 1.8 times greater than the distance between the axis of the clamping lever and the inner lining.

24. The adjusting device of claim 2, wherein the clamping surfaces engage the mating sloping clamping sides displaying mirror symmetry about a radial plane.

25. The adjusting device of claim 2, wherein the two clamping surfaces are inclined to one another at an angle smaller than 20 degrees.

26. The adjusting device of claim 25, wherein the two clamping surfaces are inclined to one another at an angle of between eight and fourteen degrees.

* * * * *